United States Patent
Lee et al.

(10) Patent No.: US 9,124,933 B1
(45) Date of Patent: Sep. 1, 2015

(54) METHOD AND SYSTEM FOR DETECTING UNAUTHORIZED USE OF A SET TOP BOX USING EXPECTED TERRESTRIAL SIGNAL IDENTIFICATION

(75) Inventors: Sean S. Lee, Potomac, MD (US); Scott D. Casavant, Germantown, MD (US); Kuriacose Joseph, Gaithersburg, MD (US); John L. Norin, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 13/413,822

(22) Filed: Mar. 7, 2012

(51) Int. Cl.
| | |
|---|---|
| *H04N 7/16* | (2011.01) |
| *H04N 7/167* | (2011.01) |
| *H04N 21/45* | (2011.01) |
| *H04N 21/233* | (2011.01) |
| *H04N 21/258* | (2011.01) |
| *G01S 19/16* | (2010.01) |
| *H04N 21/266* | (2011.01) |
| *H04N 21/633* | (2011.01) |
| *H04N 21/6334* | (2011.01) |

(52) U.S. Cl.
CPC .......... *H04N 21/4524* (2013.01); *G01S 19/16* (2013.01); *H04N 7/16* (2013.01); *H04N 21/233* (2013.01); *H04N 21/25841* (2013.01); *H04N 21/26613* (2013.01); *H04N 21/633* (2013.01); *H04N 21/6334* (2013.01)

(58) Field of Classification Search
CPC ......... G01S 19/14; G01S 19/18; H04N 7/165; H04N 7/16; H04N 21/26613; H04N 21/633; H04N 21/6334; H04N 21/6332; H04N 21/2584; H04N 21/4524
USPC .................................................. 725/25, 31
See application file for complete search history.

(56) References Cited

U.S. PATENT DOCUMENTS

| | | | |
|---|---|---|---|
| 6,118,976 A * | 9/2000 | Arias et al. ................... | 725/118 |
| 8,387,084 B1 | 2/2013 | Klappert et al. | |
| 8,589,580 B2 | 11/2013 | Gutarin et al. | |
| 2002/0023010 A1 | 2/2002 | Rittmaster et al. | |
| 2003/0177504 A1 | 9/2003 | Paulo et al. | |
| 2004/0172647 A1 | 9/2004 | Godwin | |
| 2004/0203768 A1* | 10/2004 | Ylitalo et al. ............... | 455/435.1 |
| 2006/0227718 A1* | 10/2006 | Wang et al. ................... | 370/252 |

(Continued)

FOREIGN PATENT DOCUMENTS

EP      2312767      *  4/2011

OTHER PUBLICATIONS

Non-final Office action dated Jul. 5, 2013 in U.S. Appl. No. 13/413,806, filed Mar. 7, 2012 by Scott D. Casavant et al.

(Continued)

*Primary Examiner* — Benjamin R Bruckart
*Assistant Examiner* — Aksahy Doshi (57) ABSTRACT

A system and method for determining unauthorized use of a set top box includes a terrestrial signal determination module in the set top box that receives terrestrial signals from a terrestrial source comprising terrestrial signal identifiers. A memory in the set top box stores expected terrestrial signal identifiers for a location of the user device. The user device also includes a comparison module comparing the received terrestrial signal identifier to the location-based terrestrial signal identifiers and a disable module disabling the user device from receiving satellite signals in response to comparing.

26 Claims, 7 Drawing Sheets

(56) References Cited

U.S. PATENT DOCUMENTS

| | | | |
|---|---|---|---|
| 2006/0287915 | A1 | 12/2006 | Boulet et al. |
| 2007/0067817 | A1* | 3/2007 | Hamilton et al. ............. 725/100 |
| 2007/0129012 | A1* | 6/2007 | Snow .......................... 455/26.1 |
| 2008/0136969 | A1 | 6/2008 | Chang et al. |
| 2008/0155619 | A1 | 6/2008 | Constantinof |
| 2009/0125950 | A1* | 5/2009 | Chaudhry et al. ............. 725/64 |
| 2009/0193450 | A1* | 7/2009 | Kellerman .................... 725/25 |
| 2009/0213000 | A1* | 8/2009 | Gross et al. ............. 342/357.03 |
| 2010/0005484 | A1* | 1/2010 | Candelore et al. ............. 725/31 |
| 2010/0113061 | A1* | 5/2010 | Holcman ................... 455/456.1 |
| 2010/0115544 | A1 | 5/2010 | Swenson |
| 2010/0154010 | A1 | 6/2010 | Chang |
| 2010/0302030 | A1* | 12/2010 | Yamada .................. 340/539.13 |
| 2011/0010735 | A1 | 1/2011 | Newell |
| 2011/0055862 | A1 | 3/2011 | Harp et al. |
| 2011/0081020 | A1* | 4/2011 | Loomis et al. ................ 380/270 |
| 2011/0096243 | A1* | 4/2011 | Casagrande .................. 348/731 |
| 2011/0320628 | A1 | 12/2011 | Gutarin et al. |
| 2012/0155385 | A1* | 6/2012 | Bencheikh .................... 370/328 |
| 2013/0059602 | A1* | 3/2013 | Cho et al. ................... 455/456.1 |

OTHER PUBLICATIONS

Final Rejection dated Oct. 21, 2013 in U.S. Appl. No. 13/413,806, filed Mar. 7, 2012 by Scott D. Casavant et al.

Non-final Office action dated Dec. 16, 2014 in U.S. Appl. No. 13/413,806, filed Mar. 7, 2012 by Scott D. Casavant et al.

Final Rejection dated Jun. 9, 2015 in U.S. Appl. No. 13/413,806, filed Mar. 7, 2012 by Scott D. Casavant et al.

* cited by examiner

| Station | Received Score | Not Received Score |
|---|---|---|
| DC 4 | 10 | -2 |
| DC 5 | 10 | -2 |
| DC 7 | 10 | -2 |
| DC 9 | 10 | -2 |
| BALTIMORE 2 | 2 | 0 |
| BALTIMORE 11 | 2 | 0 |
| NYC 5 | -200 | 0 |
| NYC 8 | -200 | 0 |
| All Others | -500 | 0 |

METHOD AND SYSTEM FOR DETECTING UNAUTHORIZED USE OF A SET TOP BOX USING EXPECTED TERRESTRIAL SIGNAL IDENTIFICATION

TECHNICAL FIELD

The present disclosure relates generally to communicating between a service provider and a user device, and, more specifically, to disabling service of a set top box based upon received terrestrial signal identification.

BACKGROUND

The statements in this section merely provide background information related to the present disclosure and may not constitute prior art.

Satellite programming has become increasingly popular due to the wide variety of content and services available. Typically, a set top box is configured to receive satellite programming in response to conditional access provided through the use of encryption and a conditional access module. When a consumer has proper conditional access credentials, the signals are decrypted so that the output may be viewed by the user.

Satellite television must follow various broadcasting rules set by the government. Other rules are contractually negotiated with various content providers. Such rules provide limitations for users based on geography. A satellite television provider may have rights to distribute content to a particular country such as the United States while not having authorization to provide broadcast service into adjacent countries such as Canada and Mexico. Because satellite beams do not exactly follow the borders, the satellite beams may overlap various boundaries to a certain extent. Further, geographic restrictions may be provided for various types of signals including local signals that are not to be received outside of a particular designated marketing area.

Further, providers of various equipment may not be authorized to distribute the equipment in particular geographic areas.

Preventing unauthorized use is important from a business perspective.

SUMMARY

The present disclosure provides a system and method for reducing unauthorized use of set top boxes in a particular area by comparing identifiers for received over-the-air terrestrial signals with location-based terrestrial signal identifiers based on user device location.

In one aspect of the disclosure, a method includes receiving a plurality of terrestrial signals, associating terrestrial signal identifiers with a location of a user device, storing the terrestrial signal identifiers in a memory of the user device, comparing the terrestrial signal identifiers to the plurality of terrestrial signals and disabling the user device from receiving satellite signals in response to comparing.

In a further aspect of the disclosure, a system for determining unauthorized use of a set top box includes a terrestrial signal determination module in the set top box that receives terrestrial signals from a terrestrial source comprising terrestrial signal identifiers. A memory in the set top box stores location-based terrestrial signal identifiers for a location of the user device. The user device also includes a comparison module comparing the received terrestrial signal identifier to the location-based terrestrial signal identifiers and a disable module disabling the user device from receiving satellite signals in response to comparing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

The following description refers to communicating content, data, control signals, data objects and the like. The content data, control signals, and data objects are communicated electronically using electrical or optical control signals.

Figure 1:
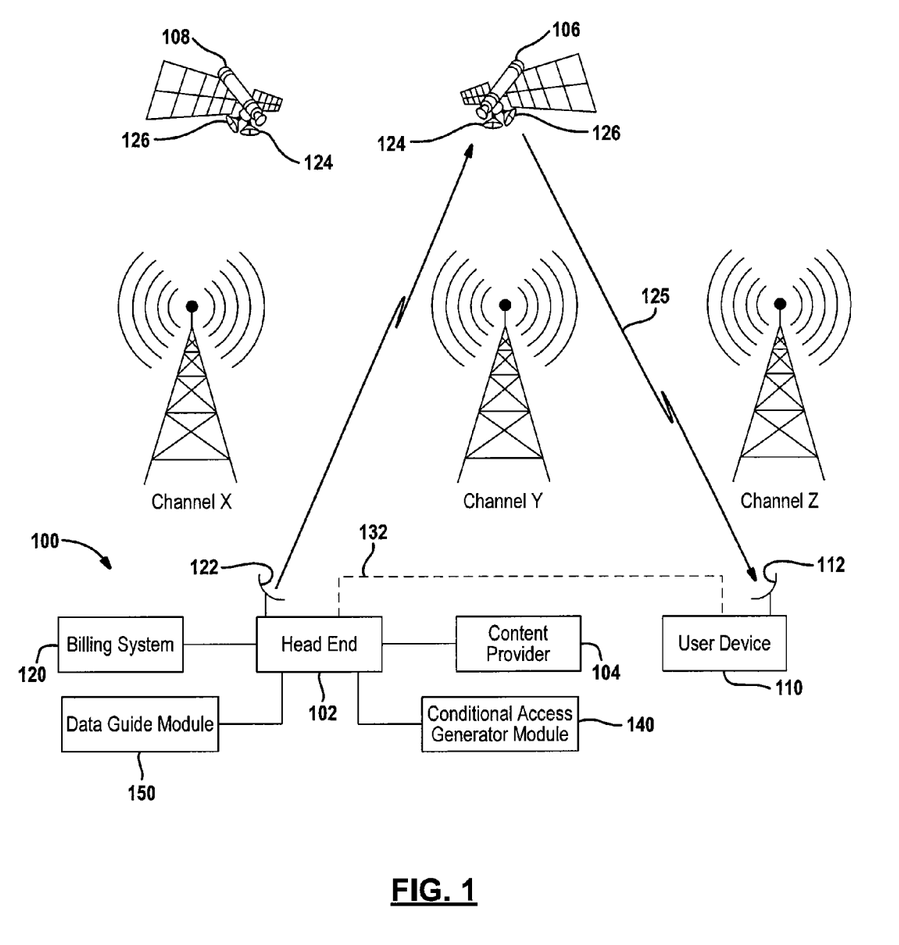
FIG. 1 is a diagrammatic representation of a satellite communication system according to the present disclosure.

Referring now to FIG. 1, a content communication system 100 includes a head end 102 that is used as a processing, security and transmission source. Of course the various functions may be separated. A plurality of content providers, one of which is shown at reference numeral 104 may provide content to the head end 102 for distribution therefrom.

A first satellite 106 and a second satellite 108 may also be incorporated into the system 100. The satellites 106, 108 may be used to communicate different types of data or different portions of various content from the head end 102.

The system 100 also includes a plurality of user devices 110 such as integrated receiver/decoders (IRDs), which may be referred to as set top boxes, satellite television set top boxes or fixed user devices. The user devices 110 may be referred to as fixed user devices because they are typically associated with a display mounted in a stationary position within a home or business. Wireless communications are exchanged between the head end 102 and the user devices 110 through one or more of the satellites 106, 108 and a fixed antenna 112 in communication with the user device 110. The wireless communications may take place at any suitable frequency, such as but not limited to, Ka band and/or Ku-band frequencies. The satellites 106, 108 may be located at different orbital positions and thus the angle relative to a user device may be different.

The satellites 106, 108 may be a geosynchronous or geostationary satellite that, in turn, rebroadcast the information over broad geographical areas on the earth that include the user devices 110. The satellites may have inter-satellite communication links for relaying data between the satellites 106 and 108.

The head end 102 may have a billing system 120 associated therewith. In FIG. 1, the billing system 120 is illustrated as separate. However, the billing system 120 may be included within the head end 102. The billing system 120 keeps track of the various user devices 110 and accounts. Each user device 110 has billing data such as a billing address or service address associated therewith. The billing or service address is an authorized location of the user device. The service address may be a street address, a postal code, or both. The address is a location that is associated with a designated marketing area. Each designated marketing area may have a predetermined number of terrestrial broadcasters associated therewith. That is, in a designated marketing area one or more over the air broadcasters may operate. Over-the-air broadcasters originated at terrestrial sources represented by way of example as broadcast towers labeled Channel X, Channel Y and Channel Z.

Channel X, Channel Y and Channel Z represent terrestrial over-the-air broadcast channels. The over-the-air broadcast channels may have various formats including analog frequencies to communicate the signals to user devices. The channel signals may also be digital signals. Some channel may be analog signals while others may be digital signals. This will vary depending upon the country or region. The channels are broadcasted using a frequency or digital signal with a channel identifier associated therewith.

The head end 102 may communicate with the satellites 106, 108 using an uplink antenna 122. The uplink antenna 122 generates a satellite uplink 123 which is received by a receiving antenna 124 on the satellite. The satellite generates a downlink 125 using a downlink antenna 126. The downlinks 125 may provide regional coverage such as for the Continental United States or provide spot beam coverage for a specific geographic location within a larger geographic area. The downlinks 125 are communicated to the antenna 112.

Various types of data such as security information, encryption-decryption information, expected terrestrial signal identifiers, received signal scores, content, or content portions may be communicated terrestrially or via the satellites 106, 108. A communication network 132 such as the public switched telephone network (PSTN), a terrestrial wireless system, stratospheric platform, an optical fiber, or the like may be used to terrestrially communicate with the fixed user device 110.

Data or content provided to head end 102 from the content provider 104 may be transmitted, for example, via the uplink antenna 122 to the satellites 106,108. Among other things, the example head end 102 of FIG. 1 provides program content to the user devices 110 and coordinates with the user device 110 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 124. The head end 102 may also be used to add a satellite signal identifier into the satellite signals.

Security of assets broadcast via the satellites 106, 108 may be established in a conditional access generator module 140 by applying encryption and decryption to assets or content during content processing and/or during broadcast (i.e., broadcast encryption). For example, an asset may be encrypted based upon a control word (CW) known to the head end 102 and known to the user devices 110 authorized to view and/or playback the asset. In the illustrated example communication system 100, for each asset the head end 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption. Thus, a user device may be deauthorized by not allowing the user device access to the proper control word.

The control word packet may be generated at the conditional access generator module and communicated from the head end 102 with other control data as a conditional access packet (CAP). The CAP may be used to provide tuning data, geographic location profiles that include expected terrestrial signal identifiers or other data.

The conditional access generator module 140 may generate a conditional access packet that includes expected terrestrial signal identifiers that are expected to be received at the user device 110. Each designated marketing area may have associated over-the-air signals that may be received. The conditional access packet may thus include the terrestrial signal identifiers or score associated with the terrestrial identifiers for the user location which are to be stored within the user device 110 and used for later comparison. The conditional access generator module 140 may generate the authorized identifier signals after interaction with the billing system 120. The authorized identifiers correspond to expected signals for the user device location.

A guide data module 150 may be used to provide program guide data to the user devices 110 through the satellite 106, 108. This is done using various data objects. The guide data module 150 may also provide terrestrial signal identifiers for the expected terrestrial signals using the data object. In summary, expected terrestrial signal identifiers may be communicated in various ways including, but not limited to, through terrestrial networks, conditional access packets and data objects.

The user device 110 may compare the received terrestrial signals with the expected terrestrial signals or the identifiers associated therewith. If the expected terrestrial signal identifiers do not correspond to the received satellite terrestrial signals or the identifiers associated therewith, the user device 110 may have been relocated to an unauthorized viewing area such as out of the country or out of a region. The user device 110 may also compare scores associated with each of the received signals. As will be described below, each of the received signals may have a received score and/or a not received score. The actual signals received are provided with the associated score and compared to a threshold. When the composite score of all the scores of the received signal is compared to a threshold, access or disabling of the user device may be performed. This will be described further below. Access to the programming provided by the satellites 106 and 108 may thus be disabled. Details of this are described in detail below.

Figure 2:
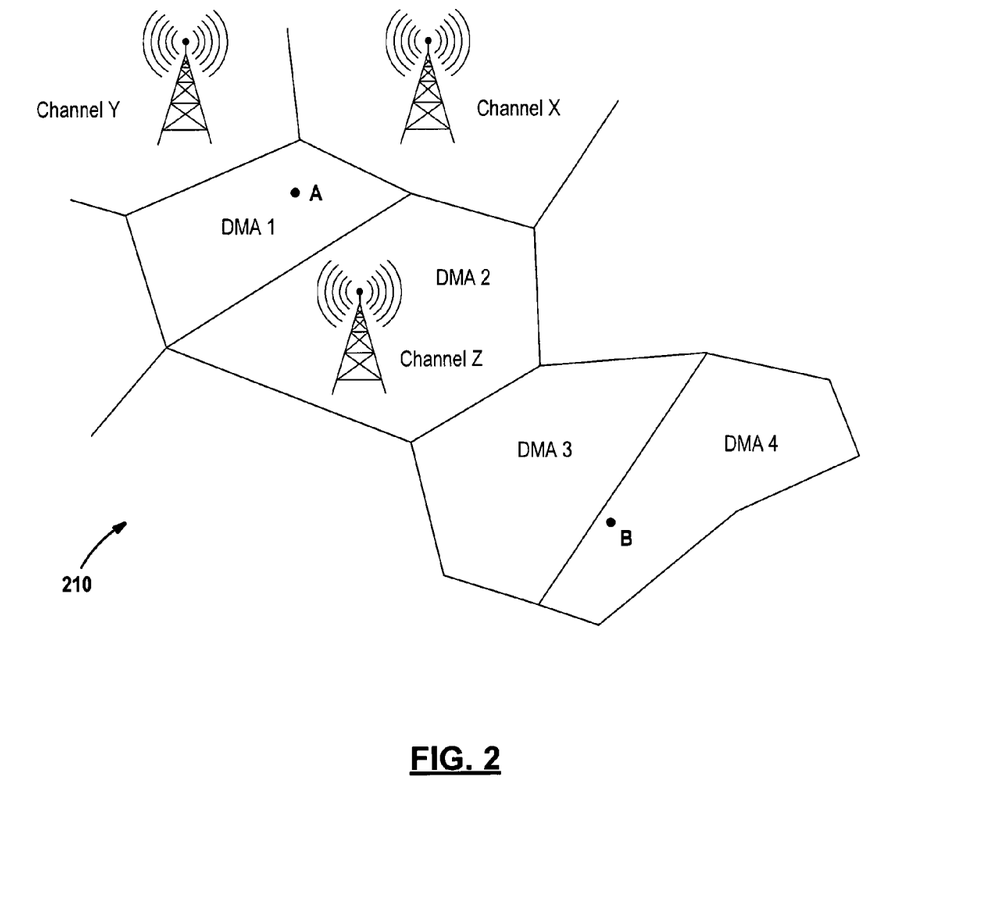
FIG. 2 is a detailed view of different designated marketing areas.

Referring now to FIG. 2, a terrestrial geographical region 210 is illustrated. The geographical region 210 may include a plurality of designated marketing areas that include a first designated marketing area DMA1, a second designated marketing area DMA2, a third designated marketing area DMA3 and a fourth designated marketing area DMA4. A designated marketing area is a geographic area (closed polygon) that has fixed boundaries on the surface of the earth. The geographic area of the DMA may correspond to postal codes, county or state boundaries. Designated marketing areas may not overlap. Designating marketing areas are used to determine the proper local signals that are authorized to be received at a user-receiving device.

DMAs throughout the country may have unique combinations of terrestrial signals that may be received. Location A is situated in DMA1 which receives channel signals from terrestrial sources such as Channel X, Channel Y and Channel Z. Thus, when the expected terrestrial signal is received correspond to Channel X, Channel Y and Channel Z and signals from terrestrial over-the-air channels, Channel X, Channel Y and Channel Z are received at Location A, the receiving device is authorized to receive satellite signals. Location B may only receive over-the-air channel signals from Channel Z located in DMA2. Location B is located in DMA4 and thus only one over-the-air terrestrial channel signal, Channel Z, is expected at Location B. If the over-the-air terrestrial channel signal, Channel Z, is not received.

Figure 3:
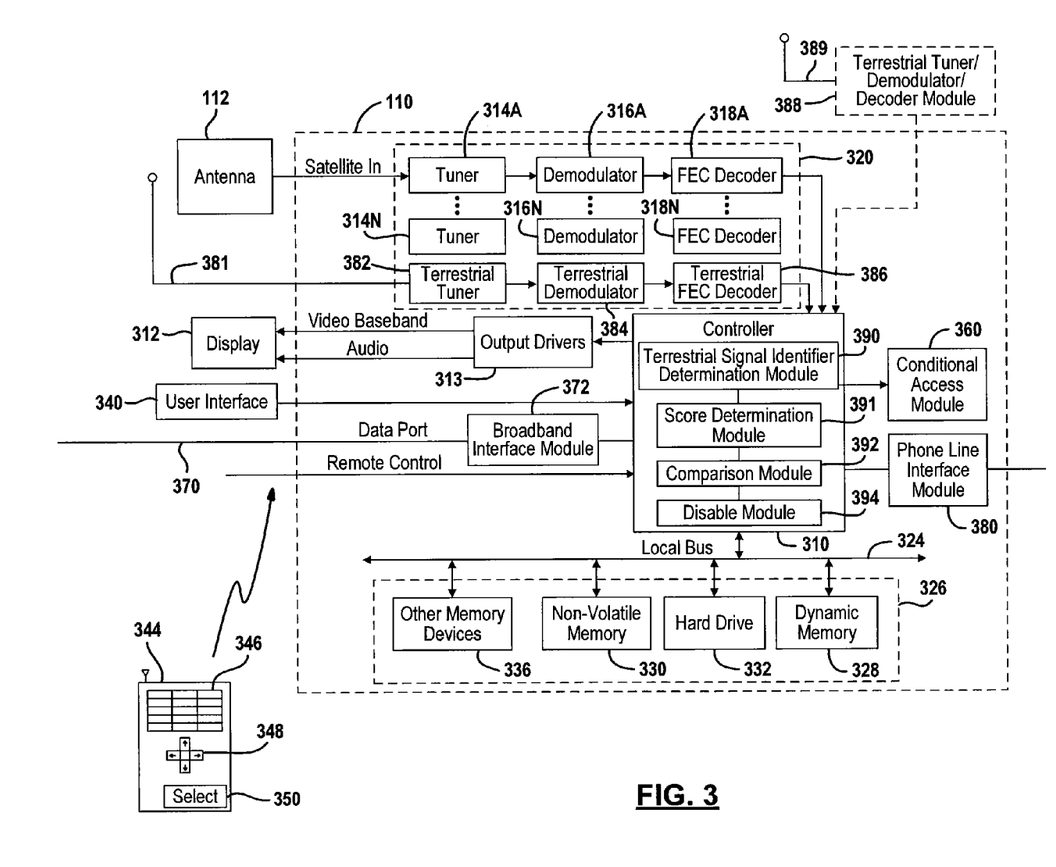
FIG. 3 is a block diagrammatic view of a set top box formed according to the present disclosure.

Referring now to FIG. 3, a user device 110 is illustrated. The user device 110 may include the fixed antenna 124. The user device 110 may include a controller 310. The controller 310 may control various operations as will be described below. The user device 110 may be in communication with a display 312 through output drivers 313. The output drivers 313 may generate desired audio and video output formats suitable for the particular display 312.

The controller 310 may be a general processor such as a microprocessor. The controller 310 may be used to coordinate the control and the functions of the user device. These functions may include the functions of a receiving circuit 320. The receiving circuit 320 may include a tuner 314, a demodulator 316, a forward error correction (FEC) decoder 318 and any buffers or other functions. More than one tuner, demodulator and FEC decoder may be provided as indicated by the reference numerals "A" and "N". One constructed example may include four tuners, demodulators and decoders, although various numbers of tuners, demodulators and decoders may be provided depending upon the system requirements. The tuner 314 receives the signal or data from the broadcast channel. The signal may include programming content or different types of data including program guide data. The demodulator 316 demodulates the signal to form a demodulated signal or demodulated data. The decoder 318 decodes the demodulated signal to form a decoded data or decoded signal.

The controller 310 may also be coupled to a local bus 324. The local bus 324 may be in communication with a memory module 326. The memory 326 may be used for storing expected satellite signal identifiers for the authorized location. The memory may include a dynamic memory 328, such as random access memory (RAM) which changes often and whose contents may be lost upon the interruption of power or boot up. The bus 324 may also be coupled to a non-volatile memory 330. One example of a non-volatile memory is an electrically erasable programmable read only memory (EEPROM). One specific type of EEPROM is flash memory. Flash memory is suitable since it is sectored into blocks of data that may be individually erased and rewritten.

A hard drive 332 may also be in communication with the local bus 324. The hard drive 332 may act as a digital video recorder for storing video and storing various data and various content. The various data stored in the memory 326 may include metadata such as titles, actors, directors, descriptions, posters, identifiers, availability start times, availability end times, pricing data, timing data, program guide data, internal data regarding tuning, search recording and watching recorded content, a receiver identifier, a conditional access module identifier, expected terrestrial signal identifiers for the user device location, and various other types of data. The hard drive may also be interchangeable with another memory device with a large capacity.

Other memory devices 336 may also be coupled to the local bus 324. The other memory devices may include other types of dynamic memory, non-volatile memory, or may include removable memory devices. The display 312 may be changed under the controller 310 in response to data in the dynamic memory 328 or non-volatile memory 330.

The controller 310 may also be coupled to a user interface 340. The user interface 340 may be various types of user interfaces such as a keyboard, push buttons, a touch screen, a voice activated interface, or the like. The user interface 340 may be used to select a channel, select information, change the volume, change the display appearance, or other functions. The user interface 340 may be used in addition to a remote control device 344. The remote control device 344 may include a keypad 346, an arrow keypad 348, and a select button 350. Inputs to the user device may be provided by the remote control device or through the user interface 340.

A conditional access card module 360 (CAM) may also be incorporated into the user device. Access cards, such as a conditional access module, may be found in DIRECTV® units. The conditional access card module 360 may provide conditional access to various channels and wireless signals generated by the system. The conditional access card module 360 may control the decryption of program content. Not having an access card or not having an up-to-date conditional access card module 360 may prevent the user from receiving or displaying various video and other content from the system.

The controller 310 may also be in communication with a data port 370. The data port 370 may be a broadband data port that is coupled to the controller 310 through a broadband interface module 372. The broadband interface module 372 may allow wireless or wired communication between external devices with the controller 310. The controller 310 through the broadband interface module 372 may communicate with the internet and various systems such as the head end 102 of the content communication system. Callback signals may be provided through the broadband interface module 372 from the controller 310. The call back signals may include weather or signal strength logs.

The controller 310 may also be in communication with a phone link interface module 380. The phone link interface module 380 may couple the user device 110 to a public switched telephone network (PSTN). The user device 110 may generate callback signals to the head end through the phone interface module 380.

Callback signals may be provided through the broadband interface module 372, the phone interface module 380 or both. A callback signal may be generated through the broadband interface module 72 or the phone line interface module 380 for communicating data therethrough.

The user device 110 may also be connected to a terrestrial antenna 381. The terrestrial antenna 381 receives over-the-air terrestrially generated signals and communicates them to the terrestrial over-the-air tuner 382. A terrestrial demodulator 384 demodulates the tuned terrestrial signals. A terrestrial FEC decoder 386 may decode the demodulated terrestrial signal and provided to the controller 310. The terrestrial tuner 382, the terrestrial demodulator 384 and the terrestrial FEC decoder 386 may be located internal to the user-receiving device 110. Although only one terrestrial tuner 382, demodulator 384 and decoder 386 are shown, more than one may be used in the external module. An unused tuner may be used to evaluate received terrestrial signals.

User device 110 may also be directly connected to an external terrestrial tuner/demodulator/decoder module 388. The terrestrial tuner/demodulator/decoder module 488 may also include a separate tuner, demodulator and decoder therein. The tuner of the terrestrial tuner/demodulator/decoder module 388 may be in communication with a terrestrial antenna 389 for receiving terrestrially generated over-the-air signals. The terrestrial tuner/demodulator/decoder module 388 may be provided through an input connector external to the receiving device.

The controller 310 may include a terrestrial signal determination module 390. The terrestrial signal determination module 390 may determine the over-the-air terrestrial signals received. The terrestrial signal determination module 390 may also determine identifiers received from the various over-the-air channels. The identifiers are determined from the received over-the-air terrestrial signals. The identifiers may be part of the received signals. The terrestrial signal identifiers may be, but are not limited to, a channel identifier, a program identifier, a call sign or a broadcast frequency.

The terrestrial signal identifier determination module 390 may be activated at various times to monitor the received terrestrial signals and determine unauthorized use of the user device. For example, upon initial powering of the user device, the terrestrial signal determination module 390 may receive or query for terrestrial signals. Monitoring may also take place on a schedule or on a periodic basis.

An optional score determination module 391 is used to determine a score associated with each of the received terrestrial signal identifiers. The score determination module may add up the scores for all of the terrestrial signals received to generate a composite score.

The controller 310 may also include a comparison module 392. The comparison module 392 receives the terrestrial signal or terrestrial signal identifiers from the terrestrial signal identifier determination module 390. The comparison module 392 compares the terrestrial signals (or the identifiers associated therewith) with the expected terrestrial signal identifiers stored within the memory 326.

The comparison module 392 may also compare the composite score generated above with a threshold. When the composite score is above or below a threshold, the user device may be disabled from receiving the satellite signals.

If the received terrestrial signal and the stored or expected terrestrial signal identifiers do not correspond sufficiently or the scores do not correspond sufficiently, the disable module 394 may be used to disable the user device. Correspondence may be an exact match in the case of the expected/received signals or a comparison greater than or less than a threshold. The disable module 394 may prevent the user device and the components therein from demodulating or decoding the satellite signals. The disable module 394 may also be used to generate a screen display indicating the set top box has been displayed since the location of the set top box does not correspond to the registered location.

Figure 4A:
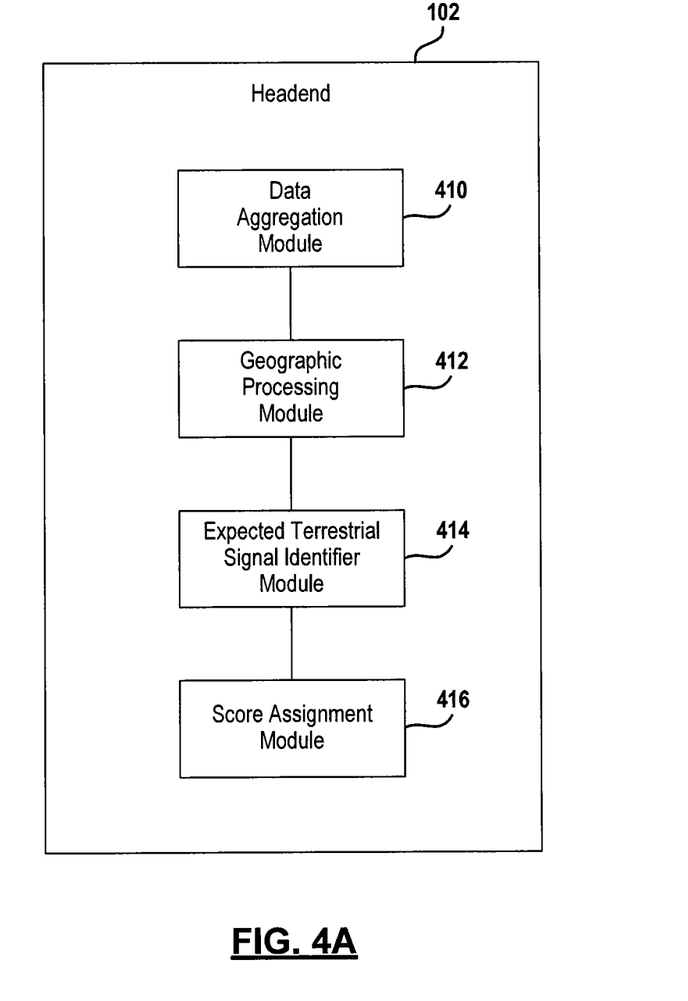
FIG. 4A is a block diagrammatic view of a content processing system according to the present disclosure.

Referring now to FIG. 4A, a simplified block diagrammatic view of the head end 102 is set forth. The head end 102 may include a data aggregation module 410. The data aggregation module 410 may be used to obtain terrestrial signal data corresponding to locations of the user devices. The data aggregation module 410 may include the terrestrial signal identifiers that may be received at a particular designated marketing area. Thus, the data aggregation module 410 may be used to generate a chart or database that includes the expected terrestrial signals or identifiers associated therewith for various designated marketing areas throughout a service area or region.

A geographic processing module 412 processes the data from the data aggregation module 410 and when a particular user device is activated into the system, generates a conditional access packet data object or other communication signal at an expected terrestrial signal identifier module 414. The communication signal sent to the user device from the head end 102 may include the expected terrestrial signal identifiers for the designated marketing area.

A score assignment module 416 may also be included in the head end 102. The score assignment module 416 may generate a communications signal. The communication signal may also include a table that maps terrestrial signal identifiers with probabilities of reception or a score corresponding to the probability for that set top box based on location. For example, some terrestrial signals might be received by the set top due to being on the edge of reception, some terrestrial signals definitely should be received, and some terrestrial signals definitely should not be received. Higher scores may correspond to higher probabilities; negative scores may correspond to lower probabilities. The data may be communicated to the set top box in a manner that provides some type of abstraction to prevent tampering therewith. The data may therefore be encrypted or encoded. When the data is received at the set top box the data may also be stored in a location of the memory that is non-accessible by the user.

Figure 4B:
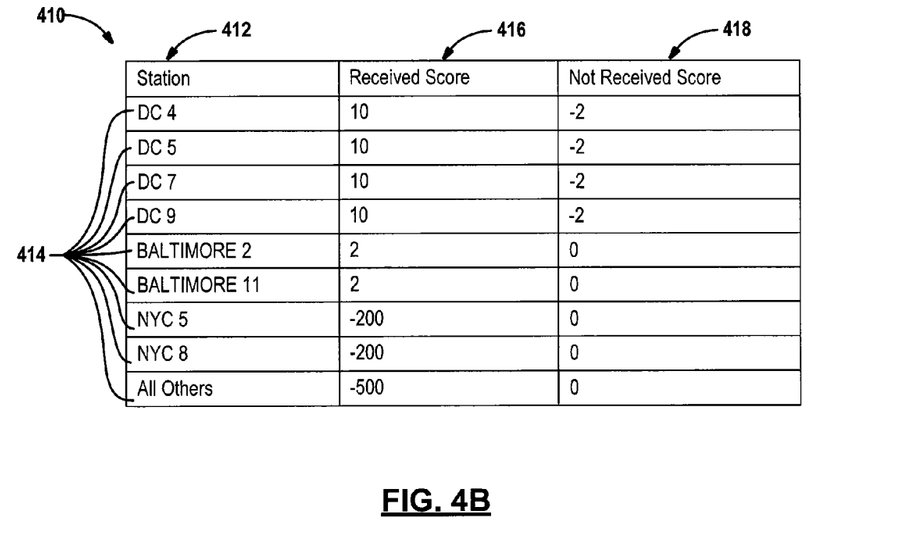
FIG. 4B is a table having terrestrial signal identifiers, a received score and a not received score column.

Referring now to FIG. 4B, an example of a table 410 having terrestrial signal identifiers in a column 412 are illustrated. The terrestrial signal identifiers may be alphanumeric identifiers associated with the expected terrestrial signals and not expected terrestrial signals. Each of the terrestrial signal identifiers 414 may have a corresponding receive score in column 416 and a not received score in column 418. As will be noted, both positive and negative numbers may be provided within the received score and the not received score. The set top box in the score determination module obtains a received score and possibly a not received score for each of the signals received or not received within the table 410. A summation of all the scores is a composite score that generates one value. In this example, a very large positive value corresponds to a high confidence that the set top box is within the desired area. If the result is a negative value, there is a high confidence that the set top box is not in a designated area. The large value or negative values may be determined by comparison to a threshold. Different values may provide different outputs. For example, if the composite value is around zero, no action may be taken. The scoring table 410 may be customized for each set top box based upon its location. Therefore, the table 410 is a location-based table.

Figure 6:
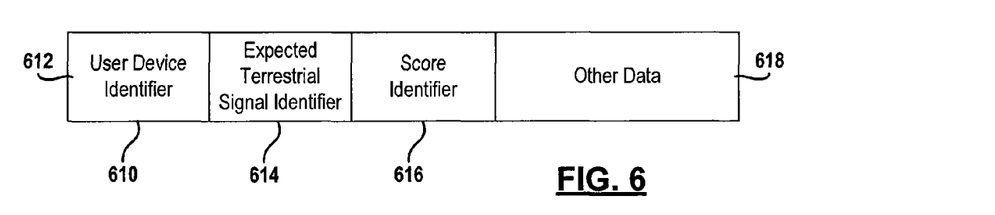
FIG. 6 is a diagrammatic view of a conditional access packet signal.

A score identifier 616 may also be included within a conditional access packet signal. The score identifier 616 may correspond to the table illustrated in FIG. 4B. That is, for each terrestrial identifier illustrated in the table, a received score and a potentially not received score may also be provided.

Figure 5:
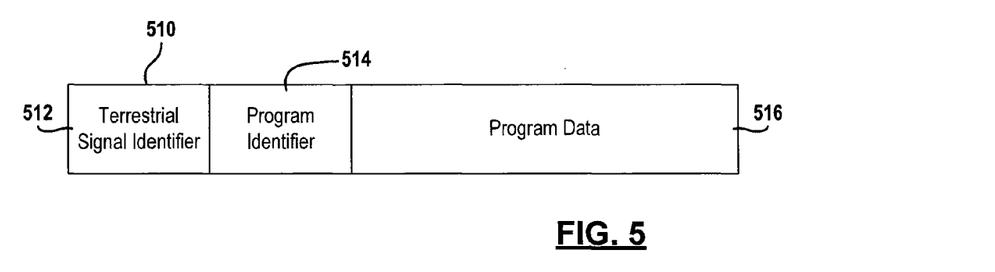
FIG. 5 is a diagram of a terrestrial signal having various data portions therein.

Referring now to FIG. 5, a simplified version of an over-the-air terrestrial signal 510 is set forth. Each terrestrial signal 510 may include a terrestrial signal identifier 512. The terrestrial signal identifier 512 may include various types of identifiers including a channel, station identifier, call sign, program identifier, frequency or other type of identifier. Such identifiers may be included in a programming guide list as well. Another type of identifier that may be included within the terrestrial signal is a program identifier 514 for identifying a specific program. The program identifier 514 may identify the specific program broadcasted. Thus, by knowing the program identifier 514, the particular terrestrial source corresponding to the program identifier may also be determined. A program data portion 516 may also be included within the terrestrial signal 510.

Referring now to FIG. 6, a conditional access packet signal 610 is set forth. The conditional access packet signal 610 includes a user device identifier 612 for a user device of interest. The user device identifier 612 may be generated for a specific user device. The user device identifier 612 may also include a list of user devices should updates be necessary for user devices in a particular designated marketing area. The conditional access packet signal 610 may also include an expected satellite signal identifier. As mentioned above, the terrestrial signal identifier may include an over-the-air station identifier, an over-the-air channel identifier or an over-the-air frequency identifier. The terrestrial signal identifier 614 may include a plurality of expected terrestrial signal identifier associated with the particular user device location. Of course, other data 618 may also be included within the conditional access signal 610.

Figure 7:
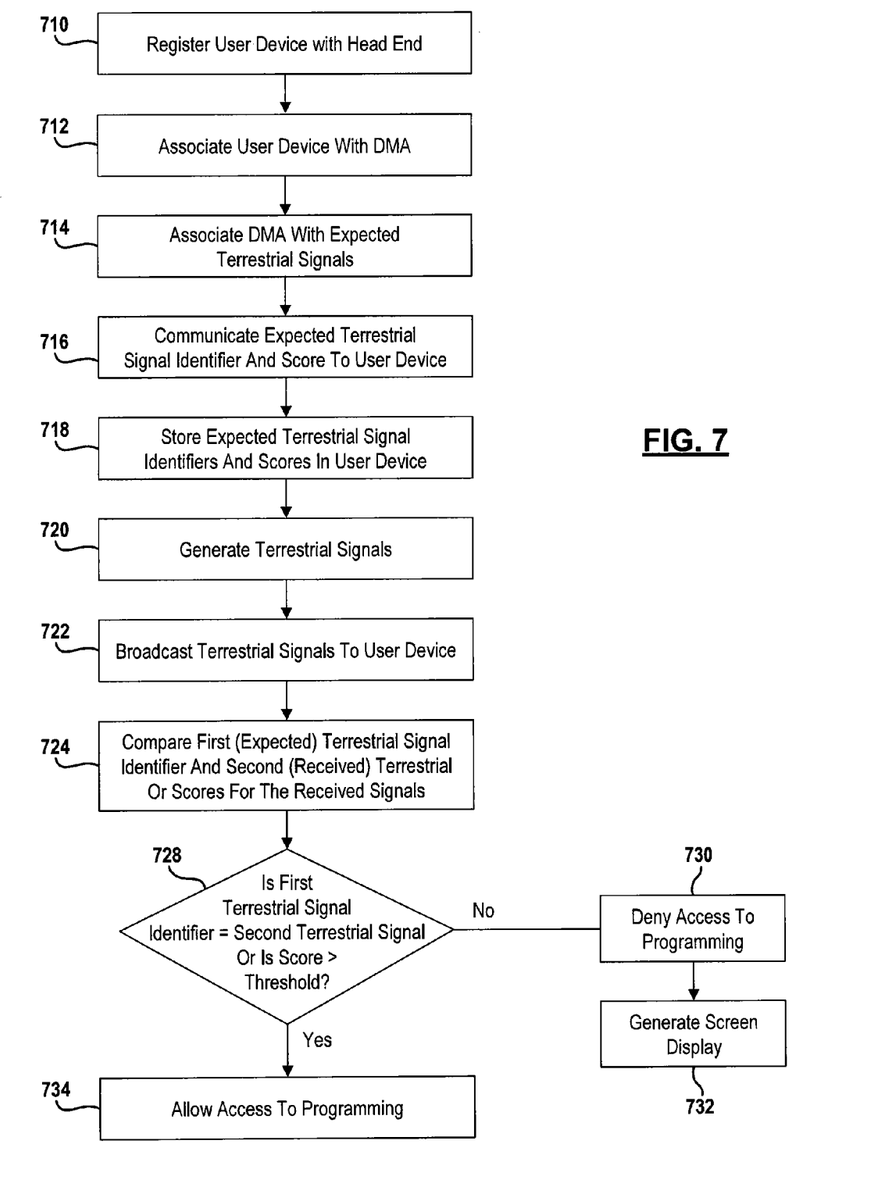
FIG. 7 is a flowchart of a method of operating the system.

Referring now to FIG. 7, a method for operating the communication system is set forth. In step 710, the user device is registered with the head end. The user device may be activated and authorized by the head end and/or billing system upon initial use or configuration. Authorization may also be performed through an authorized dealer or on-site service technician. When setting up a user account, a service address for the user device is provided. The service address may correspond to a designated marketing area.

In step 712, the user device is associated with a designated marketing area. The designated marketing area may thus have associated designated marketing area expected terrestrial signals associated therewith in step 714. The designated marketing area may thus have associated designated marketing area non-expected terrestrial signals and also terrestrial signals with a certain probability of being received. The designated marketing area may also have an associated score with each of the expected and non-expected terrestrial signals as is illustrated in the table set forth in FIG. 4B.

In step 716, a first expected terrestrial signal identifier is communicated to the user device. This may be performed using a conditional access packet signal, a data object or terrestrial network as described above. The expected terrestrial signal identifiers may correspond to the terrestrial over-the-air signals expected to be received at the user device from the terrestrial transmitters in the geographic area near or within the particular designated marketing area or authorized location of the user device. The expected terrestrial signals may correspond to station or channel identifiers or a frequency of the over-the-air signals. A score may also be communicated with the expected signal in step 716. Other types of identifiers may also be communicated. The expected terrestrial signals may be communicated in an encrypted manner. Further, an entire table of expected terrestrial signals for different regions may be communicated. Only the designated marketing area expected terrestrial signals may be communicated. However, scores for signals that are not supposed to receive may also be provided as shown in table 4B. In step 718, the first expected terrestrial signal identifiers and scores are stored within the user device after being received.

In step 720, the terrestrial signals have terrestrial signal identifiers that are generated by the terrestrial source. Terrestrial signals have at least some type of unique identifier or unique frequency associated therewith. In step 722, the terrestrial signals are communicated terrestrially or broadcasted over-the air with the terrestrial signal identifiers to the user device. An unused over-the air tuner may be used for determining the received terrestrial signal identifiers. This may take place periodically when a terrestrial tuner is not used.

In step 724, the first (expected) terrestrial signal identifier and the second (received) terrestrial signal identifier are compared. The comparison of the first terrestrial signal and the second terrestrial signal may take place using the scores and a composite value for each of the terrestrial signals received that is generated from the score. In step 728, it is determined whether the first terrestrial signal identifier is equivalent to the second terrestrial signal identifier. In this manner, it is determined whether the expected terrestrial signal identifier is the same or corresponding to the second received terrestrial signal identifier. Step 728 may also determine whether the score is less than or greater than a threshold. In the present example, if the score is greater than a threshold the system continues to provide access in step 734. It should be noted that more than one terrestrial signal identifier may be compared in this determination. For example, one location may expect signals from multiple terrestrial over-the-air sources. As mentioned above with respect to FIG. 2, different DMAs or locations may have different expected signals. When the first terrestrial signal identifier does not correspond to the second terrestrial signal identifier, step 730 denies access to programming. Denial of access to programming may take place in different manners including the prevention of decrypting of the received program signal. In step 732, a screen display may be generated that requires the user to call customer service to access programming that has been disabled since the geographic location of the set top box is improper.

Referring back to step 734, when the first terrestrial signal identifier corresponds to the second terrestrial signal identifier or the comparison of a score compares favorably with a score, step 734 allows access to the programming. As mentioned above, this method may take place at various times to ensure the set top box or user device is located in the proper geographic location.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   determining expected terrestrial signal identifiers for a billing address of a fixed user device at a head end;
   receiving a plurality of received terrestrial signals at the fixed user device, each of the plurality of the received terrestrial signals having one of a plurality of received terrestrial signal identifiers identifying a respective source of each of the received terrestrial signals;
   communicating the expected terrestrial signal identifiers to the fixed user device from the head end;
   storing the expected terrestrial signal identifiers in a memory of the fixed user device;
   comparing the expected terrestrial signal identifiers to the plurality of received terrestrial signal identifiers; and
   denying the fixed user device from accessing satellite signals in response to comparing.

2. The method as recited in claim 1 wherein receiving the plurality of received terrestrial signals comprising receiving over-the air signals with an over-the-air terrestrial tuner.

3. The method as recited in claim 1 wherein receiving the plurality of received terrestrial signals comprising receiving over-the air signals with a previously unused over-the-air terrestrial tuner.

4. The method as recited in claim 1 wherein receiving the plurality of received terrestrial signals comprising receiving over-the air signals with a previously unused over-the-air terrestrial tuner within the user device.

5. The method as recited in claim 1 wherein receiving the plurality of received terrestrial signals comprising receiving over-the air signals with an unused over-the-air terrestrial tuner directly connected to and external to the user device.

6. The method as recited in claim 1 wherein communicating expected terrestrial signal identifiers comprises associating a designated marketing area with a location of the user device and associating the terrestrial signal identifiers with the designated marketing area.

7. The method as recited in claim 1 wherein communicating the expected terrestrial signal identifiers comprises communicating the expected terrestrial signal identifiers to the fixed user device through a terrestrial network.

8. The method as recited in claim 1 wherein communicating the expected terrestrial signal identifiers comprises communicating the expected terrestrial signal identifiers to the fixed user device through a satellite.

9. The method as recited in claim 1 wherein receiving the plurality of received terrestrial signals comprises receiving the plurality of terrestrial signals comprising terrestrial over-the-air channel identifiers.

10. The method as recited in claim 1 wherein receiving the plurality of received terrestrial signals comprises receiving the plurality of terrestrial signals comprising terrestrial over-the-air station identifiers.

11. The method as recited in claim 1 wherein communicating the expected terrestrial signal identifiers to the fixed user device comprises associating terrestrial signal identifiers with an authorized location of a set top box.

12. The method as recited in claim 1 further comprising generating a screen display in response to comparing.

13. The method as recited in claim 1 further comprising associating a respective score with each of the received terrestrial signal identifiers and determining a composite score based on the respective score for each of the plurality of received terrestrial signals received.

14. A fixed user device comprising:
    a terrestrial signal determination module receiving terrestrial signals from terrestrial sources comprising received terrestrial signal identifiers that identify a respective source of the received terrestrial signals;
    a memory storing expected location-based terrestrial signal identifiers for a billing address of the fixed user device, wherein the expected location-based terrestrial signal identifiers are determined at a head end and received therefrom;
    a comparison module comparing the expected location-based terrestrial signal identifiers to the received terrestrial signal identifiers; and
    a disable module denying the fixed user device from accessing satellite signals in response to comparing.

15. The user device as recited in claim 14 wherein the received terrestrial signal identifiers comprise channel identifiers.

16. The user device as recited in claim 14 wherein the received terrestrial signal identifiers comprise station identifiers.

17. The user device as recited in claim 14 wherein the received terrestrial signal identifiers comprise frequency identifiers.

18. The user device as recited in claim 14 wherein the location comprises an authorized location.

19. The user device as recited in claim 14 wherein the memory comprises a score for each of the location-based terrestrial signal identifiers and further comprising a composite score module generating a composite score corresponding to the received terrestrial signal identifiers and wherein the comparison module compares the composite score to a threshold score.

20. A system comprising:
    a user device as recited in claim 14; and
    the head end.

21. The system as recited in claim 20 wherein the user device comprises a satellite television set top box.

22. The system as recited in claim 20 wherein the head end generates the location-based terrestrial signal identifiers in response to billing data.

23. The system as recited in claim 21 wherein the head end communicates the received terrestrial signal identifiers to the satellite television set top box.

24. The system as recited in claim 21 wherein the head end communicates the expected location based satellite signal identifiers to the set top box through a satellite.

25. The system as recited in claim 21 wherein the head end communicates the expected location based satellite signal identifiers to the set top box through a terrestrial network.

26. The system of claim 21 further comprising a display associated with the set top box, said set top box generating a screen display on the display in response to comparing.

\* \* \* \* \*